United States Patent
Chang et al.

(10) Patent No.: US 9,549,193 B2
(45) Date of Patent: Jan. 17, 2017

(54) VIDEO ENCODING METHOD AND VIDEO ENCODING DEVICE

(71) Applicant: Novatek Microelectronics Corp., Hsinchu (TW)

(72) Inventors: Yu-Wei Chang, Hsinchu (TW); Ying-Hung Lu, Kaohsiung (TW); Yen-Ju Huang, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 702 days.

(21) Appl. No.: 13/662,538

(22) Filed: Oct. 28, 2012

(65) Prior Publication Data

US 2014/0079124 A1 Mar. 20, 2014

(30) Foreign Application Priority Data

Sep. 18, 2012 (TW) ............................. 101134175 A

(51) Int. Cl.
*H04N 19/00* (2014.01)
*H04N 19/436* (2014.01)
*H04N 19/43* (2014.01)

(52) U.S. Cl.
CPC ............ *H04N 19/436* (2014.11); *H04N 19/43* (2014.11)

(58) Field of Classification Search
CPC .............................. H04N 19/436; H04N 19/43
(Continued)

(56) References Cited

U.S. PATENT DOCUMENTS 8,798,139 B1 * 8/2014 Jacob .................. H03M 7/4006
375/240.02
2008/0219349 A1 9/2008 Huang et al.
(Continued)

FOREIGN PATENT DOCUMENTS

CN 1953549 4/2007
CN 102647592 8/2012

OTHER PUBLICATIONS

Chen, Ching-Yeh, et al. "Level C+ data reuse scheme for motion estimation with corresponding coding orders." Circuits and Systems for Video Technology, IEEE Transactions on 16.4 (2006): 553-558.*
(Continued)

*Primary Examiner* — Jeffery Williams
(74) *Attorney, Agent, or Firm* — Jianq Chyun IP Office

(57) ABSTRACT

A video encoding method is provided, which includes: deciding a first search window of a first macroblock in a reference image, and deciding a second search window of a second macroblock in the reference image, wherein the first search window is at least partially overlapped with the second search window; reading the first search window and the second search window from a memory and executing a first encoding stage having motion estimation and binarization encoding; storing an encoding result of the first encoding stage in the memory; reading the encoding result from the memory and executing a second encoding stage. The second encoding stage has a context entropy coding, and an encoding order of the context entropy coding is different from that of the motion estimation, and the first encoding stage is executed in parallel with the second encoding stage. Accordingly, a bandwidth demand of the memory is decreased.

18 Claims, 13 Drawing Sheets

(58) Field of Classification Search
USPC .......................................... 375/240, 240.24
See application file for complete search history.

(56) References Cited

U.S. PATENT DOCUMENTS

| | | | |
|---|---|---|---|
| 2009/0245349 | A1 | 10/2009 | Zhao et al. |
| 2011/0002389 | A1* | 1/2011 | Xu .................. H04N 19/61 375/240.16 |
| 2011/0069751 | A1 | 3/2011 | Budagavi |
| 2012/0019617 | A1* | 1/2012 | Ahn et al. .............. 348/43 |
| 2013/0034160 | A1* | 2/2013 | Schmit .............. H04N 19/43 375/240.16 |

OTHER PUBLICATIONS

Chen, Tung-Chien, Yu-Wen Huang, and Liang-Gee Chen. "Analysis and design of macroblock pipelining for H. 264/AVC VLSI architecture." Circuits and Systems, 2004. ISCAS'04. Proceedings of the 2004 International Symposium on. vol. 2. IEEE, 2004.*

Chen, Ching-Yeh, et al. "Level C+ data reuse scheme for motion estimation with corresponding coding orders." IEEE Transactions on Circuits and Systems for Video Technology 16.4 (2006): 553.*

Freitas, Alex A., and Simon H. Lavington. Mining very large databases with parallel processing. vol. 9. Springer Science & Business Media, 1997.*

"Office Action of Taiwan Counterpart Application", issued on Mar. 20, 2015, p. 1-p. 5.

Jen-Chieh Tuan, et al., "On the Data Reuse and Memory Bandwidth Analysis for Full-Search Block-Matching VLSI Architecture", IEEE, Transactions on Circuits and Systems for Video Technology, vol. 12, No. 1, Jan 2002, pp. 61-72.

Ching-Yeh Chen, et al., "Level C+ Data Reuse Scheme for Motion Estimation With Corresponding Coding Orders", IEEE, Transactions on Circuits and Systems for Video Technology, vol. 16, No. 4, Apr. 2006, pp. 553-558.

"Office Action of China Counterpart Application," issued on May 20, 2016, p. 1-p. 5.

* cited by examiner

VIDEO ENCODING METHOD AND VIDEO ENCODING DEVICE

CROSS-REFERENCE TO RELATED APPLICATION

This application claims the priority benefit of Taiwan application serial no. 101134175, filed on Sep. 18, 2012. The entirety of the above-mentioned patent application is hereby incorporated by reference herein and made a part of this specification.

BACKGROUND

Technical Field

The invention relates to a video encoding method and a video encoding device using the same.

Related Art

Generally, when a segment of video is to be encoded, the video is divided into a plurality of frames, where each frame includes a plurality of slices, each slice includes a plurality of macroblocks, and each macroblock is further divided into one or a plurality of blocks. When a temporal redundancy between the frames is calculated, a motion vector between a current frame and a reference frame is calculated. Calculation of the motion vector is to use pixel values on the reference frame to predict a macroblock of the current frame, and a prediction result is processed with discrete cosine transform, quantization, run length coding and entropy coding. When a motion vector of a macroblock in the current frame is calculated, pixel values in a corresponding search window in the reference frame are obtained. Generally, the reference frame is stored in a memory, and when the motion vector is calculated, the corresponding search window is read from the memory.

FIG. 1 is a schematic diagram of reading a search window.

Referring to FIG. 1, a current frame 110 includes macroblocks 111 and 112. A reference frame 120 includes search windows 121 and 123. When a motion vector of the macroblock 111 is calculated, the search window 121 has to be read from the memory. When a motion vector of the macroblock 112 is calculated, the search window 123 has to be read from the memory. A region 122 is an overlapped portion between the search window 121 and the search window 123. Therefore, after the motion vector of the macroblock 111 is calculated, the motion vector of the macroblock 112 may be calculated as long as the portion of the search window 123 that is not overlapped to the search window 121 is read. After the macroblocks of the same row are encoded, the search window 121 is probably not in the memory. Therefore, when the motion estimation is executed on the macroblocks of a next row, a search window has to be further read from the memory, and such search window probably partially overlapped to the search window 121. In this way, a part of the pixel values in the search window is read twice, which may increase a bandwidth demand of the memory.

Calculation of the motion vectors requires a large amount of computations and a large memory bandwidth. Therefore, how to decrease a bandwidth demand of memory and increase a video encoding speed is an important issue to be studied in the related field.

SUMMARY

Embodiments of the invention are directed to a video encoding method and a video encoding device, which decreases a bandwidth demand of a memory.

An embodiment of the invention provides a video encoding method, which is adapted to a video encoding device. The video encoding method includes following steps. A first search window of a first macroblock in a reference image is decided, and a second search window of a second macroblock in the reference image is decided, where the first search window is at least partially overlapped with the second search window. The first search window and the second search window are read from a memory, and a first encoding stage is executed on the first macroblock and the second macroblock, where the first encoding stage includes a motion estimation and a binarization encoding. An encoding result of the first encoding stage is stored in a memory. The encoding result is read from the memory, and a second encoding stage is executed on the encoding result, where the second encoding stage includes a context entropy coding, and an encoding order of the context entropy coding is different from that of the motion estimation, and the second encoding stage is executed in parallel with the first encoding stage.

In an embodiment, a first image includes a plurality of macroblock rows, the first macroblock is included in an $a^{th}$ macroblock row of the macroblock rows, and the second macroblock is included in a $b^{th}$ macroblock row of the macroblock rows, where a and b are positive integers, and a is different to b.

In an embodiment, an absolute difference between the positive integers a and b is greater than or equal to 2.

In an embodiment, the $a^{th}$ macroblock row includes a plurality of third macroblocks, the $b^{th}$ macroblock row includes a plurality of fourth macroblocks, and the second macroblock is a $c^{th}$ macroblock in the fourth macroblocks, where the step of executing the first encoding stage on the first macroblock and the second macroblock includes executing the motion estimation on the second macroblock after executing the motion estimation on a $(c+d)^{th}$ third macroblock in the third macroblocks, where c is a positive integer, and d is a positive integer greater than or equal to 2.

In an embodiment, the $a^{th}$ macroblock row includes a plurality of third macroblocks, the $b^{th}$ macroblock row includes a plurality of fourth macroblocks, and the video encoding method further includes following steps. A first encoder is used to sequentially execute the motion estimation on the third macroblocks. When the first encoder executes the motion estimation on an $e^{th}$ third macroblock in the third macroblocks, a second encoded is used to sequentially execute the motion estimation on the fourth macroblocks, where e is a positive integer greater than or equal to 3.

In an embodiment, the first image includes a plurality of macroblock row groups, the $a^{th}$ macroblock row and the $b^{th}$ macroblock row all belong to a first macroblock row group in the macroblock row groups. The $a^{th}$ macroblock row includes a plurality of third macroblocks, and the $b^{th}$ macroblock row includes a plurality of fourth macroblocks. The first image further includes a second macroblock row group, and the second macroblock row group includes a first macroblock row and a second macroblock row. The first macroblock row includes a plurality of fifth macroblocks, and the second macroblock row includes a plurality of sixth macroblocks. The step of executing the first encoding stage on the first macroblock and the second macroblock includes following steps. A first encoder is used to execute the motion estimation on one of the third macroblocks and one of the fourth macroblocks in interleaving, and meanwhile a second encoder is used to execute the motion estimation on one of the fifth macroblocks and one of the sixth macroblocks in interleaving.

In an embodiment, the first macroblock is included in a first image, the second macroblock is included in a second image, and the first image is different to the second image.

In an embodiment, the context entropy coding includes an arithmetic coding.

According to another aspect, an embodiment of the invention provides a video encoding device including a first encoder, a second encoder and a memory. The memory is coupled to the first encoder and the second encoder. The first encoder decides a first search window of a first macroblock in a reference image, and decides a second search window of a second macroblock in the reference image, where the first search window is at least partially overlapped with the second search window. The first encoder reads the first search window and the second search window from the memory, and executes a first encoding stage on the first macroblock and the second macroblock. The first encoding stage includes a motion estimation and a binarization encoding. The first encoder stores an encoding result of the first encoding stage in the memory. The second encoder reads the encoding result from the memory, and executes a second encoding stage on the encoding result. The second encoding stage includes a context entropy coding, and an encoding order of the context entropy coding is different from that of the motion estimation, and the second encoding stage is executed in parallel with the first encoding stage.

In an embodiment, a first image includes a plurality of macroblock rows, the first macroblock is included in an $a^{th}$ macroblock row of the macroblock rows, and the second macroblock is included in a $b^{th}$ macroblock row of the macroblock rows, where a and b are positive integers, and a is different to b.

In an embodiment, an absolute difference between the positive integers a and b is greater than or equal to 2.

In an embodiment, the $a^{th}$ macroblock row includes a plurality of third macroblocks, the $b^{th}$ macroblock row includes a plurality of fourth macroblocks, and the second macroblock is a $c^{th}$ macroblock in the fourth macroblocks. The first encoder executes the motion estimation on the second macroblock after executing the motion estimation on a $(c+d)^{th}$ third macroblock in the third macroblocks, where c is a positive integer, and d is a positive integer greater than or equal to 2.

In an embodiment, the $a^{th}$ macroblock row includes a plurality of third macroblocks, the $b^{th}$ macroblock row includes a plurality of fourth macroblocks. The first encoder sequentially executes the motion estimation on the third macroblocks. When the first encoder executes the motion estimation on an $e^{th}$ third macroblock in the third macroblocks, a third encoded sequentially executes the motion estimation on the fourth macroblocks, where e is a positive integer greater than or equal to 3.

In an embodiment, the first image includes a plurality of macroblock row groups, the $a^{th}$ macroblock row and the $b^{th}$ macroblock row all belong to a first macroblock row group in the macroblock row groups. The $a^{th}$ macroblock row includes a plurality of third macroblocks, and the $b^{th}$ macroblock row includes a plurality of fourth macroblocks. The first image further includes a second macroblock row group, and the second macroblock row group includes a first macroblock row and a second macroblock row. The first macroblock row includes a plurality of fifth macroblocks, and the second macroblock row includes a plurality of sixth macroblocks. The first encoder executes the motion estimation on one of the third macroblocks and one of the fourth macroblocks in interleaving, and meanwhile the third encoder executes the motion estimation on one of the fifth macroblocks and one of the sixth macroblocks in interleaving.

In an embodiment, the first macroblock is included in a first image, the second macroblock is included in a second image, and the first image is different to the second image.

In an embodiment, the context entropy coding includes an arithmetic coding.

According to the above descriptions, the video encoding method and the video encoding device provided by the embodiment can decrease a bandwidth demand of the memory.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
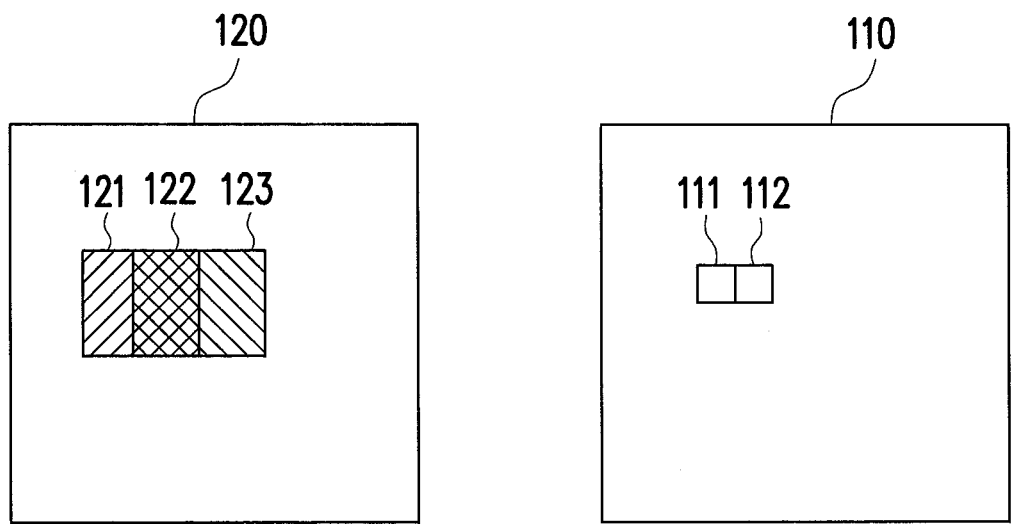
FIG. 1 is a schematic diagram of reading a search window.
Figure 2:
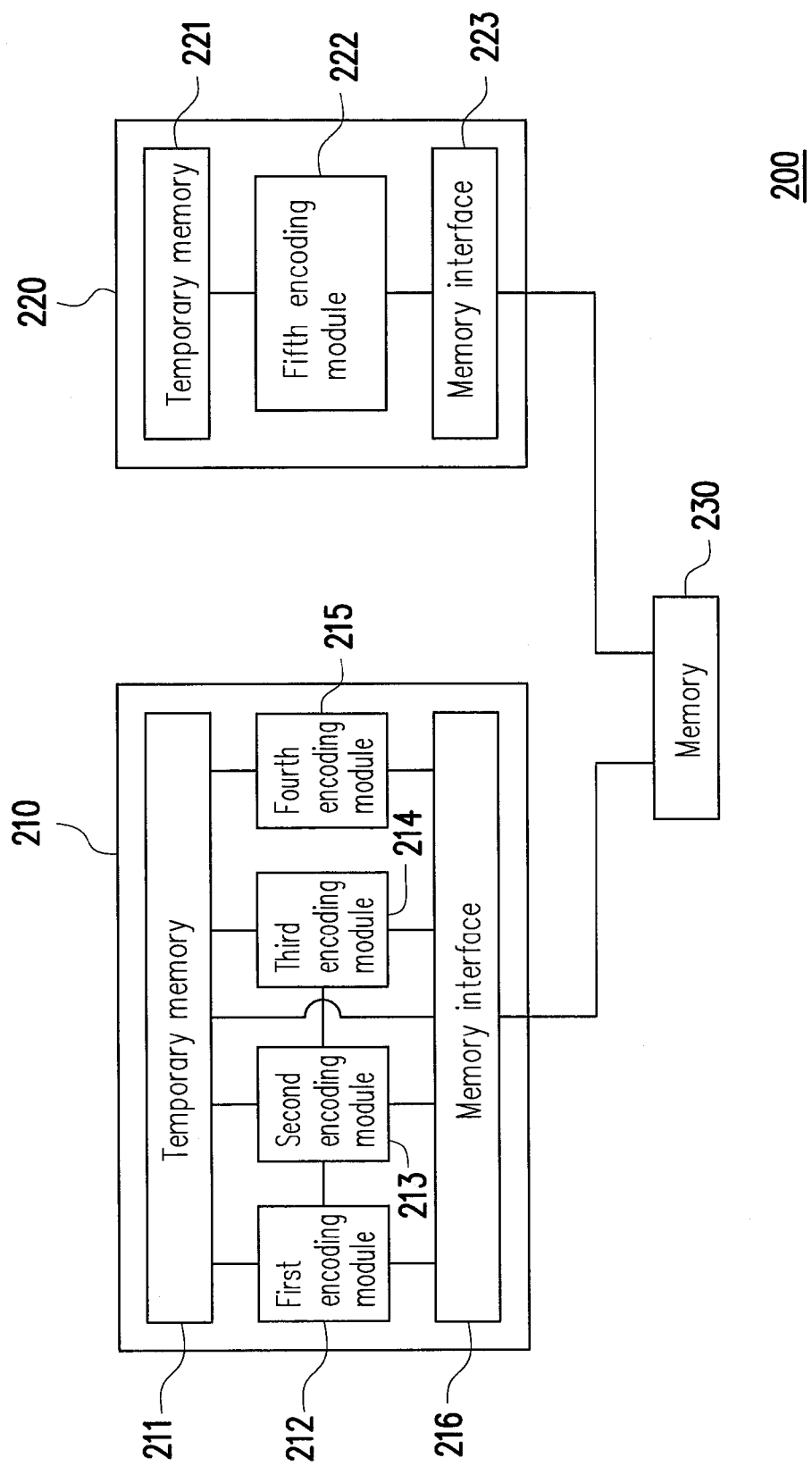
FIG. 2 is a schematic diagram of a video encoding device according to an embodiment of the invention.

FIG. 2 is a schematic diagram of a video encoding device according to an embodiment of the invention.

Referring to FIG. 2, the video encoding device 200 includes an encoder 210, an encoder 220 and a memory 230. The video encoding device 200 is used to compress a segment of video, and generates a bit stream of the video. For example, the video encoding device 200 can be disposed in a television, a digital video camera, a digital camera, a digital mobile phone, a tablet computer, a computer, a server composed of one or a plurality of computers, etc.

The encoder 210 executes a first encoding stage. The first encoding stage includes motion estimation, intra prediction, transform operation, quantization operation and binarization encoding. The encoder 210 includes a temporary memory 211, a first encoding module 212, a second encoding module 213, a third encoding module 214, a fourth encoding module 215 and a memory interface 216. In the present embodiment, all of the encoding modules in the encoder 210 operate in a manner of macroblock pipelines. In other words, a macroblock pipeline depth in the encoder 210 is 4.

The first encoding module 212 is used to execute a motion estimation. For example, the memory interface 216 reads pixel values within a search window from the memory 230, and stores the pixel values in the temporary memory 211. The first encoding module 212 executes the motion estimation according to the read pixel values and a macroblock. After the motion estimation is executed, the first encoding module 212 at least generates one or a plurality of motion vectors and a plurality of residuals.

The second encoding module 213 is used to execute an intra prediction. The intra prediction is to use pixel values in an image to predict pixel values of its own. After the intra prediction is executed, the second encoding module 213 at least generates a plurality of residuals and one prediction mode.

The third encoding module 214 is used to execute a transform operation and a quantization operation. For example, when the transform operation is executed, the third encoding module 214 performs a discrete cosine transform on the residuals generated by the first encoding module 212 or the second encoding module 213. However, the third encoding module 214 may also perform a hadamard transform, a lapped transform, or a spatial-to-frequency transform. When the quantization operation is executed, the third encoding module 214 divides a plurality of coefficients generated by the transform operation by consistent or different quantization parameters.

The fourth encoding module 215 is used to execute a binarization encoding. For example, the fourth encoding module 215 executes a variable length coding on a result of the quantization operation, so as to transform a symbol or a coefficient into one a plurality of bits. The variable length coding may be a Huffman coding or a Golomb coding. Alternatively, the fourth encoding module 215 may also encode the coefficient or the symbol by using a fixed length coding, which is not limited by the invention.

However, those skilled in the art should understand that the encoder 210 may further include other modules to execute other encoding operations. For example, the encoder 210 may also execute a run length coding, divide a macroblock into one or a plurality of blocks to execute the motion estimation, predict a motion vector of a macroblock or execute a bit control algorithm. Moreover, the encoding operations (including the motion estimation and the binarization encoding, etc.) executed by the encoder 210 may be implemented by more or less modules, so as to increase or decrease the pipeline depth of the encoder 210, which is not limited by the invention.

In the present embodiment, the encoder 210 stores an encoding result (for example, the bits generated by the binarization encoding) of the first encoding stage in the memory 230. The encoder 220 reads the encoding result and executes a second encoding stage. The second encoding stage includes a context entropy coding. In detail, the encoder 220 includes a temporary memory 221, a fifth encoding module 222 and a memory interface 223. The memory interface 223 is used to read encoding results of the first encoding stage from the memory 230, and stores the encoding results in the temporary memory 221. The fifth encoding module 222 is used to execute the context entropy coding on the encoding results. In the context entropy coding, when a symbol or a coefficient is to be encoded, the encoding result of a previous symbol or coefficient is referred according to an encoding order. The encoding order is specified in an encoding standard (for example, H.264 or MPEG-4). For example, the context entropy coding includes an arithmetic coding.

Figure 3A:
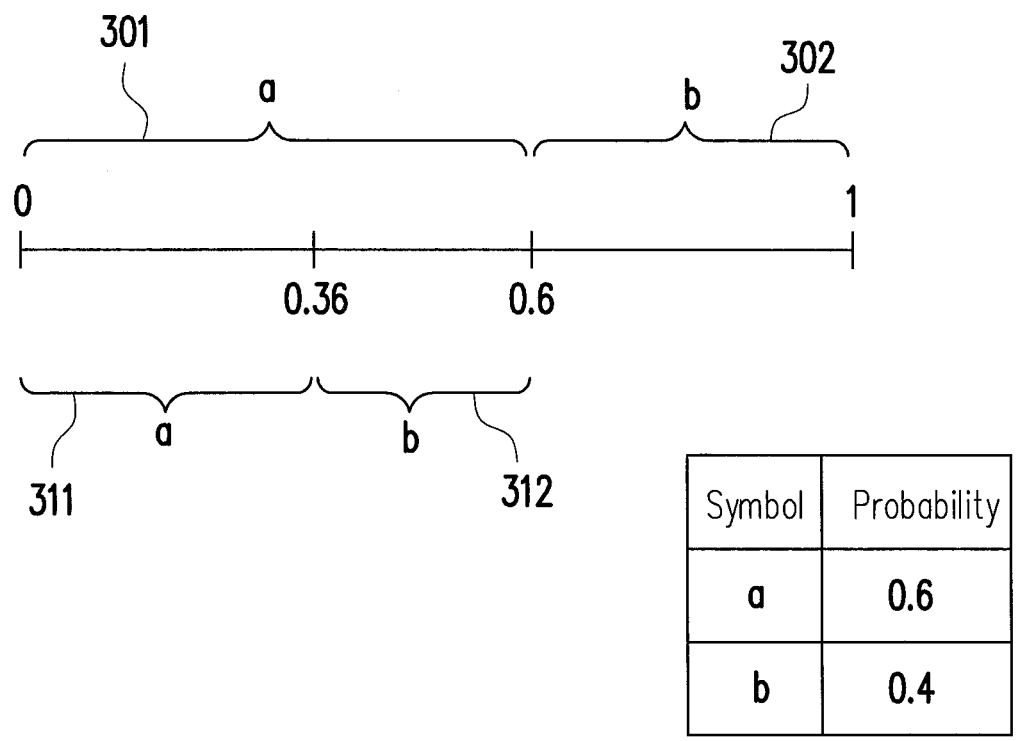
FIG. 3A is a schematic diagram illustrating an example of an arithmetic coding according to an embodiment of the invention.

FIG. 3A is a schematic diagram illustrating an example of the arithmetic coding according to an embodiment of the invention.

Conceptually, the arithmetic coding is to use a floating-point number to represent a plurality of symbols to be encoded. The floating-point number is generated according to a probability that the symbol appears. Referring to FIG. 3A, the probability that a symbol "a" appears is 0.6, and the probability that a symbol "b" appears is 0.4. An initial range of the floating-point number is 0-1, which includes a range 301 (i.e. 0-0.6) and a range 302 (i.e. 0.6-1). If the symbol "a" is encoded, the range of the floating-point number is updated to the range 301, conversely, the range of the floating-point number is updated to the range 302. It is assumed that a first symbol is "a". Then, if the second symbol is encoded, a range 311 (i.e. 0-0.36) or a range 312 (i.e. 0.36-0.6) is selected from the range 301. The range 311 represents that the second symbol is "a", and the range 312 represents that the second symbol is "b". It is assumed that the second symbol is "b". Then, the encoder selects a floating-point number (for example, 0.5) from the range 312 and transmits it to a decoder, and the decoder decodes the symbols "a" and "b" according to the floating-point number. Equivalently, one symbol may be encoded by using less than one bit or non-integer number of bits. Particularly, in the arithmetic coding, the first symbol has to be first encoded and then the second symbol is encoded, so as to obtain a correct range.

Figure 3B:
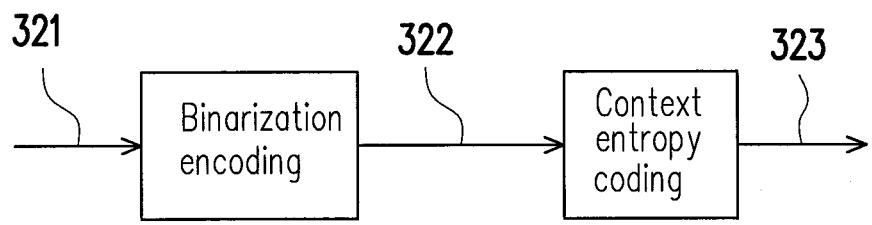
FIGS. 3B-3D are schematic diagrams of entropy coding according to an embodiment of the invention.
Figure 3C:
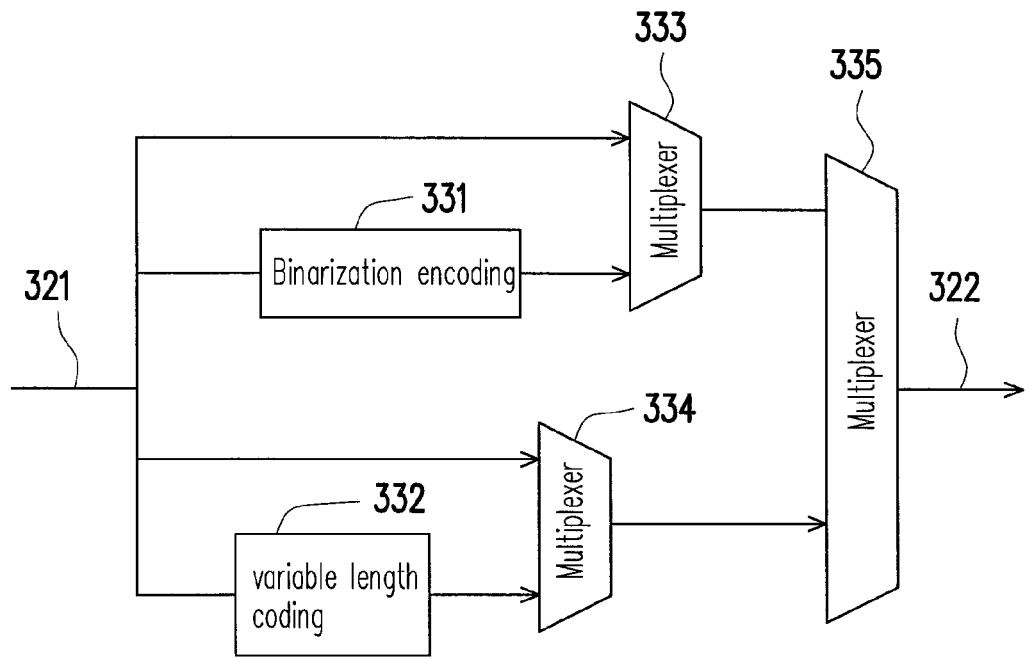
Figure 3D:
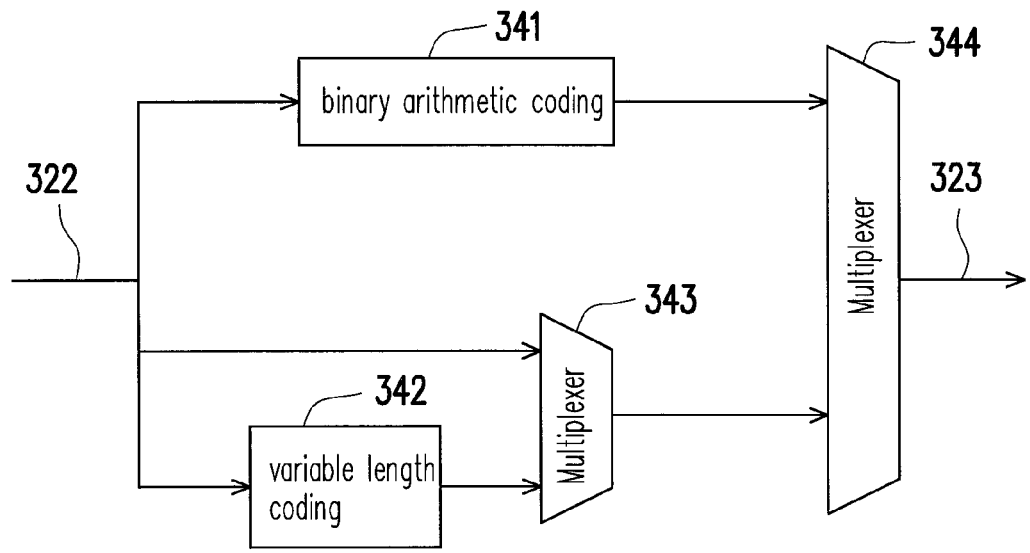

FIGS. 3B-3D are schematic diagrams of entropy coding according to an embodiment of the invention.

Referring to FIG. 3B, in the present embodiment, a coefficient or a symbol is processed with the binarization encoding and the context entropy coding. For example, a signal 321 is a coefficient "−35", and the coefficient is represented by 16 bits. After the fourth encoding module 215 performs the binarization encoding on the signal 321, a signal 322 only includes an integer number of bits, for example, "1110". The signal 322 is stored in the memory 230. The fifth encoding module 215 executes the context entropy coding (for example, the arithmetic coding) on the signal 322 to generate a signal 323.

Referring to FIG. 3C, the fourth encoding module 215 includes a binarization encoding 331, a variable length coding 332, and multiplexers 333-335. The signal 322 is processed with the binarization encoding 331 and the variable length coding 332. The multiplexer 335 selects one of the multiplexer 333 and the multiplexer 334 to output the signal 322. For example, in the H.264 encoding standard, if a context-adaptive binary arithmetic coding (CABAC) is used to implement the context entropy coding, the multiplexer 355 selects a result of the multiplexer 333. Conversely, the multiplexer 355 selects a result of the multiplexer 334. On the other hand, the multiplexer 333 determines whether or not to output a result of the binarization encoding 331 according to a characteristic of the signal 321. For example, when the signal 321 represents a prediction mode, the prediction mode does not require the operation of the binarization encoding 331. Similarly, the multiplexer 334 determines whether or not to output a result of the variable length coding 332 according to the characteristic of the signal 321.

Referring to FIG. 3D, the fifth encoding module 222 includes a binary arithmetic coding 341, a variable length coding 342 and multiplexers 343 and 344. If the CABAC is used to implement the context entropy coding, the multiplexer 344 selects a result of the binary arithmetic coding 341 to output as a signal 323. Conversely, the multiplexer 344 selects a result of the multiplexer 343. On the other hand, the multiplexer 343 determines whether or not to output a result of the variable length coding 342. In an embodiment, a coefficient or a symbol may be processed with the variable length coding 332 by the fourth encoding module 215, and may also be processed with the variable length coding 342 by the fifth encoding module 222, which is not limited by the invention.

In another embodiment, the context entropy coding may also be an adaptive Huffman coding. In the adaptive Huffman coding, both of an encoder and a decoder establish a Huffman tree. Each time when the encoder encodes a coefficient or a symbol, the Huffman tree is probably updated. Therefore, the encoder and the decoder have to perform encoding and decoder according to a same order, or otherwise the Huffman trees established by the encoder and the decoder are not synchronous. In another embodiment, the context entropy coding may also be an adaptive golomb coding or other adaptive coding algorithm, which is not limited by the invention.

It should be noticed that since the encoder 210 and the encoder 220 independently operate, even if the order of executing the motion estimation is different to the order of executing the context entropy coding, the encoder 210 and the encoder 220 still operate in parallel. Namely, the first encoding stage and the second encoding stage are executed in parallel. Moreover, the signal stored in the memory 230 is the signal 322 other than the signal 321, therefore the bandwidth demand for the memory 230 is reduced.

Figure 4:
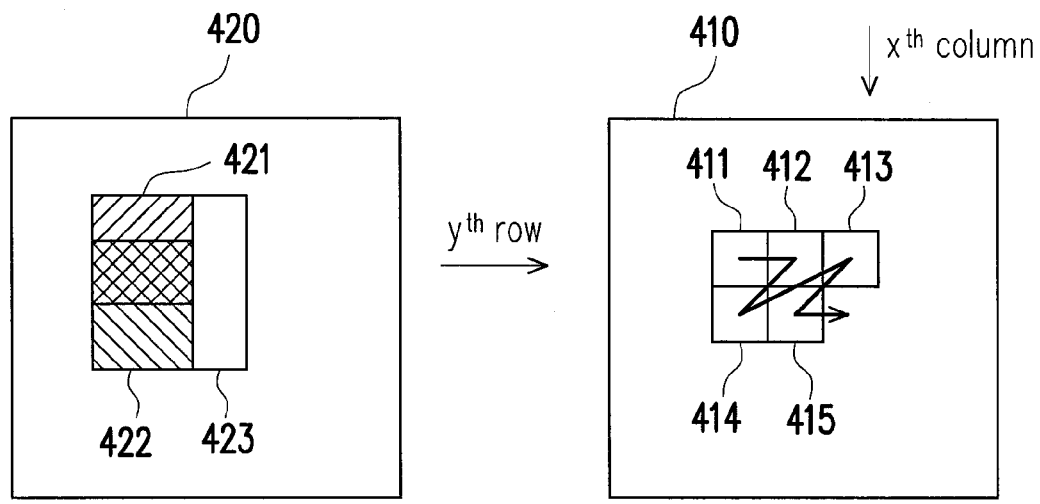
FIG. 4 is a schematic diagram of an order of motion estimation according to an embodiment of the invention.

FIG. 4 is a schematic diagram of an order of motion estimation according to an embodiment of the invention.

Referring to FIG. 4, an image 410 includes macroblocks 411-415. A video encoding device 200 is to encode the macroblocks 411-415 in the image 410 according to a reference image 420. Here, an $x^{th}$ column and a $y^{th}$ row are used to describe a position of one macroblock. For example, the macroblocks 411, 412 and 413 are located at the $y^{th}$ row, and the macroblock 413 is located at the $x^{th}$ column. The order of executing the context entropy coding is the macroblocks 411, 412, 413 and the other macroblocks behind the macroblock 413 and located at the $y^{th}$ row, and then the context entropy coding is started from the macroblock located at a $(y+1)^{th}$ row and a first column (and continue to the macroblocks 414 and 415). However, the first encoding module 212 first executes the motion estimation on the macroblock 411, and then sequentially executes the motion estimation on the macroblocks 412, 413, 414 and 415. In other words, the order of the context entropy coding is different to the order of the motion estimation in the image 410. In one image, a plurality of macroblocks of a same row form a macroblock row (for example, the macroblocks 411, 412 and 413 belong to a same macroblock row), and one image may include a plurality of macroblock rows. When executing the context entropy coding, the fifth encoding module 222 first encodes the macroblocks in one macroblock row, and then encodes the macroblocks in a next macroblock row. However, the first encoding module 212 executes the motion estimation on a macroblock in an $a^{th}$ macroblock row and a macroblock in a $b^{th}$ macroblock row in interleaving, where a and b are positive integers, and the positive integer a is different to the positive integer b. For example, in the embodiment of FIG. 4, an absolute difference between the positive integers a and b is 1. However, in other embodiments, the absolute difference between the positive integers a and b may also be greater than or equal to 2, which is not limited by the invention.

When executing the motion estimation, the first encoding module 212 decides a search window 421 of the macroblock 411 in the reference image 420, and decides a search window 422 of the macroblock 414 in the reference image 420, where the search window 421 is at least partially overlapped with the search window 422. Therefore, the motion estimation corresponding to the macroblock 411 and the motion estimation corresponding to the macroblock 414 may share a part of pixel values. When the motion estimation is to execute on the macroblock 412 and the macroblock 415, only pixel values in a region 423 is required to be read. In the present embodiment, the reference image 420 is stored in the memory 230 (shown in FIG. 2). Therefore, by executing the motion estimation according to the order shown in FIG. 4, the bandwidth demand for the memory 230 is decreased. In detail, the memory interface 216 reads pixel values in the search window 421 and the search window 422 from the memory 230 to store in the temporary memory 211. During a period that the search window 421 and the search window 422 are stored in the temporary memory 211, the first encoding module 212 executes the motion estimation corresponding to the macroblock 411 and the macroblock 414.

In the present embodiment, the image 410 and the image 420 are two frames. However, in other embodiments, the image 410 and the image 420 may also be two fields, which is not limited by the invention. On the other hand, it is assumed that a referential number of the image 410 is 1, and a referential number of the image 420 is 0. Here, a vector (the image referential number, the column of the macroblock and the row of the macroblock) is used to represent a position of a macroblock. For example, the position of the macroblock 411 is represented as a vector of (1, x−2, y), the position of the macroblock 412 is represented as a vector of (1, x−1, y), and the position of the macroblock 414 is represented as a vector of (1, x−2, y+1).

Figure 5:
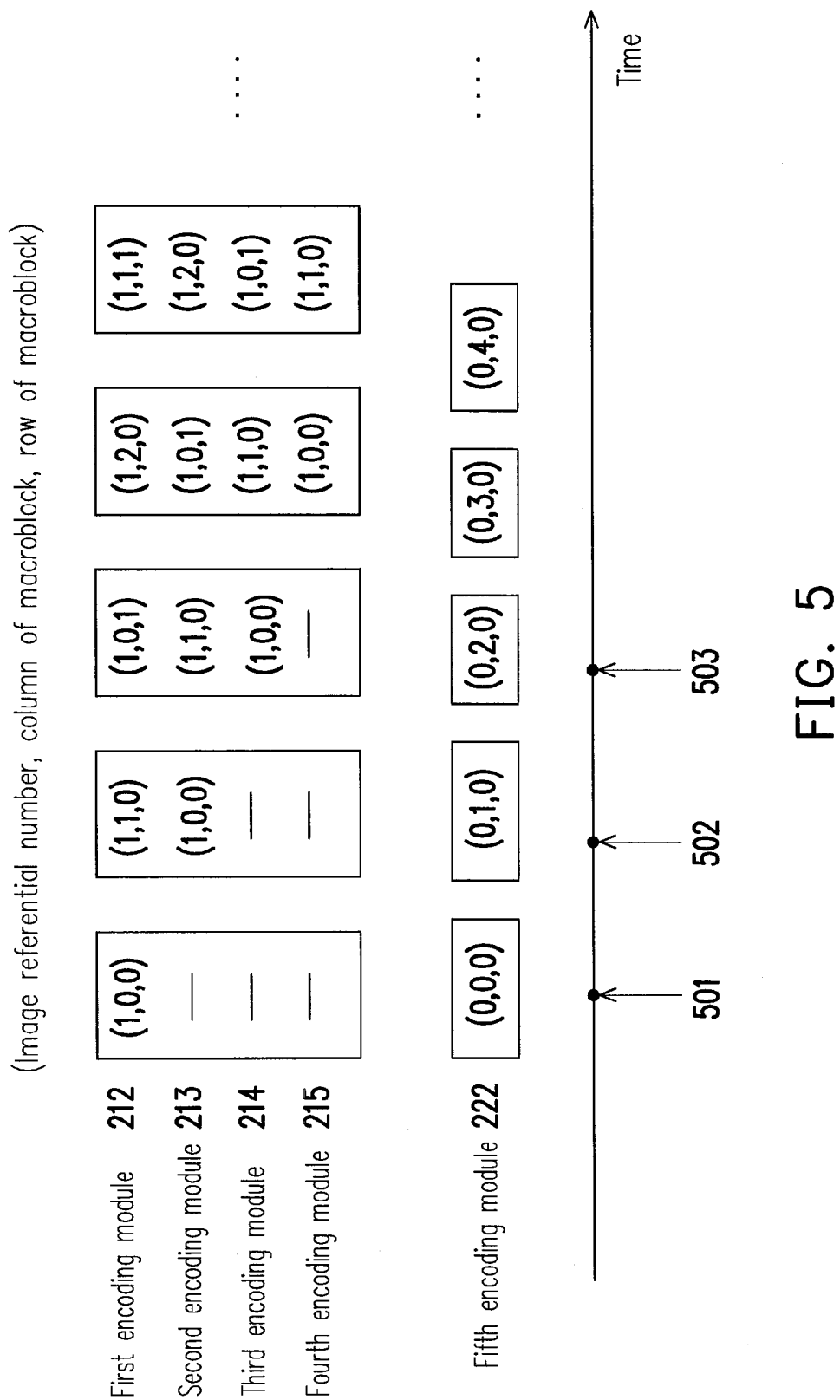
FIG. 5 is a schematic diagram of pipeline scheduling of an encoder according to an embodiment of the invention.

FIG. 5 is a schematic diagram of pipeline scheduling of an encoder according to an embodiment of the invention.

Referring to FIG. 5, at a time point 501, the first encoding module 212 executes the motion estimation on the macroblock located at a position of (1, 0, 0). At the same time, the fifth encoding module 215 executes the context entropy coding on the macroblock located at a position of (0, 0, 0).

At a time point 502, the first encoding module 212 executes the motion estimation on the macroblock located at a position of (1, 1, 0), and the second encoding module 213 executes the intra prediction on the macroblock located at the position of (1, 0, 0) (if necessary). At the same time, the fifth encoding module 215 executes the context entropy coding on the macroblock located at a position of (0, 1, 0).

At a time point 503, the first encoding module 212 executes the motion estimation on the macroblock located at a position of (1, 0, 1), the second encoding module 213 executes the intra prediction on the macroblock located at the position of (1, 1, 0) (if necessary), and the third encoding module 214 executes the transform operation and the quantization operation on the macroblock located at the position of (1, 0, 0). At the same time, the fifth encoding module 215 executes the context entropy coding on the macroblock located at a position of (0, 2, 0).

It should be noticed that the encoding modules (i.e. the first encoding module 212, the second encoding module 213, the third encoding module 214 and the fourth encoding module 215) in the encoder 210 operate according to the order of the motion estimation. However, the fifth encoding module 222 operates according to the order of the context entropy coding. On the other hand, the time required for encoding one macroblock by the fifth encoding module 222 is probably unequal to the time required for encoding one macroblock in the encoder 210.

Figure 6A:
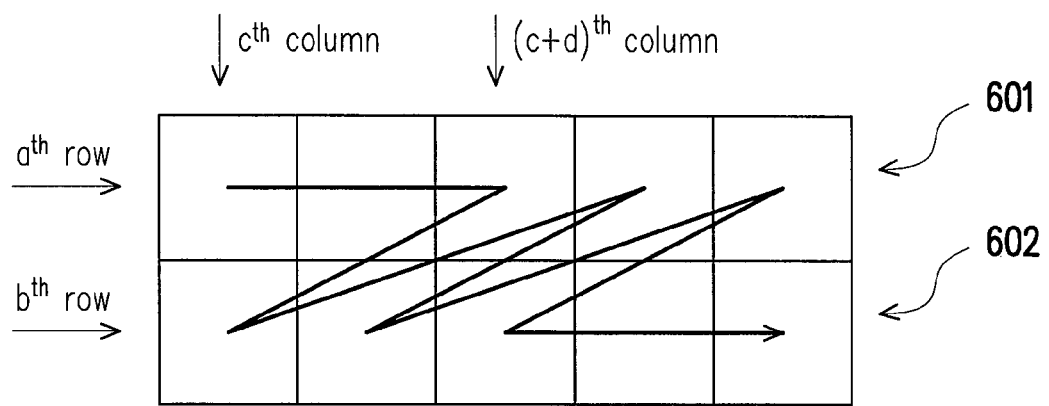
FIG. 6A and FIG. 6B are schematic diagrams of orders that a first encoding module executes the motion estimation according to another embodiment of the invention.
Figure 6B:
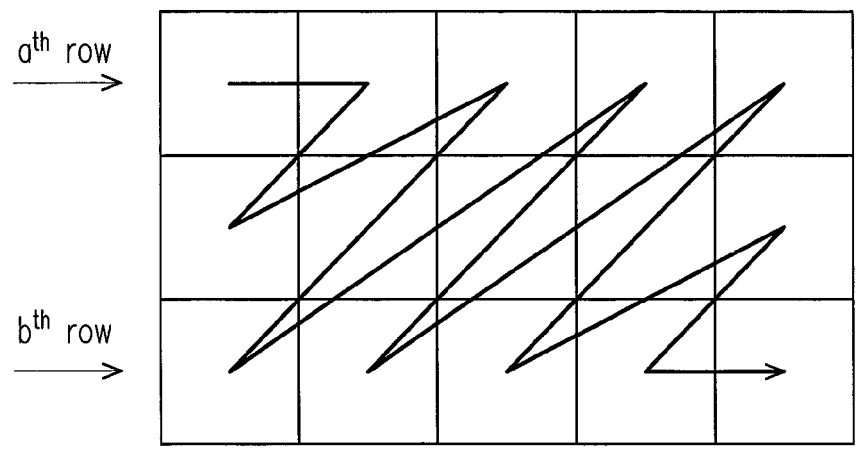

FIG. 6A and FIG. 6B are schematic diagrams of orders that the first encoding module executes the motion estimation according to another embodiment of the invention.

In the embodiment of FIG. 6A, an $a^{th}$ macroblock row 601 in the image includes a plurality of macroblocks, and a $b^{th}$ macroblock row 602 includes a plurality of macroblocks, where an absolute difference between positive integers a and b is 1. The first encoding module 212 starts to execute the motion estimation from the macroblock of the $a^{th}$ row and a $c^{th}$ column, and after the macroblock of the $a^{th}$ row and a $(c+d)^{th}$ column is encoded, the first encoding module 212 encodes the macroblock of the $b^{th}$ row and the $c^{th}$ column, where c and d are positive integers and the positive integer d is greater than or equal to 2. In an embodiment, when the macroblock of the $b^{th}$ row and the $c^{th}$ column is encoded, information of executing the motion estimation on the macroblock of the $a^{th}$ row and the $c^{th}$ column and the macroblock of the $a^{th}$ row and a $(c+1)^{th}$ column has to be obtained. Therefore, by executing the motion estimation on the macroblock of the $a^{th}$ row and the $(c+d)^{th}$ column first, a chance of data hazard occurred in the macroblock pipeline is reduced.

In the embodiment of FIG. 6B, the absolute difference between the positive integers a and b is 2. In an embodiment, the motion estimation is executed according to the order of FIG. 6, which may increase an overlapping ratio of the search windows. Therefore, the bandwidth demand of the memory 230 is decreased.

Figure 7:
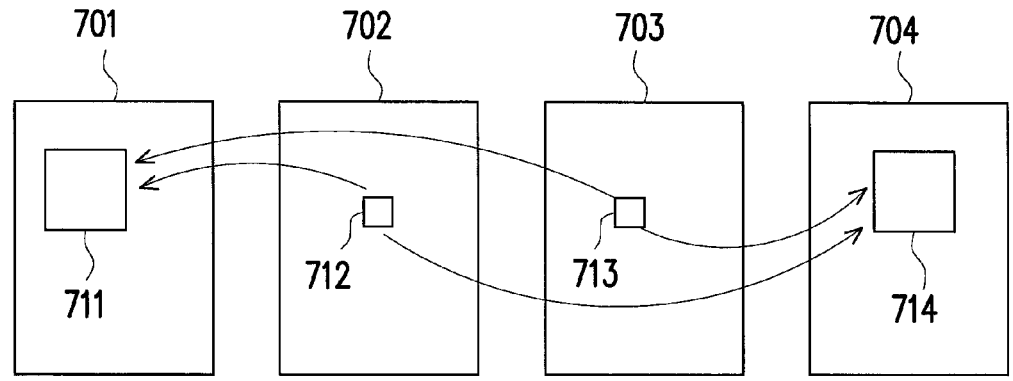
FIG. 7 is a schematic diagram of an example of sharing a reference image according to an embodiment of the invention.
Figure 7:
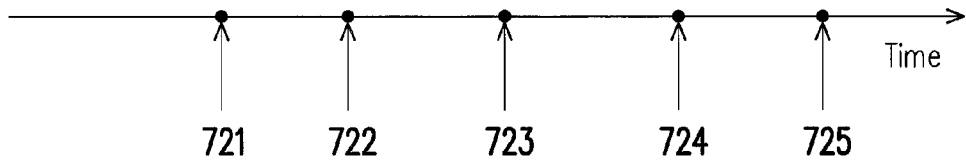

FIG. 7 is a schematic diagram of an example of sharing a reference image according to an embodiment of the invention.

Referring to an upper part of FIG. 7, when the motion estimation is executed, images 702 and 703 correspond to images 701 and 704. In detail, a macroblock 712 corresponds to search windows 711 and 714, and a macroblock 713 corresponds to search windows 711 and 714. In the embodiment of FIG. 7, the first encoding module 212 executes the motion estimation on one macroblock in the image 702 and one macroblock in the image 703 in interleaving. It is assumed that image referential numbers of the images 701-704 are respectively 0, 2, 3 and 4. Referring to a lower part of FIG. 7, at a time point 721, the first encoding module 212 executes the motion estimation on the macroblock located at a position of (2, 0, 0). At a time point 722, the first encoding module 212 executes the motion estimation on the macroblock located at a position of (3, 0, 0). At a time point 723, the first encoding module 212 executes the motion estimation on the macroblock located at a position of (2, 1, 0). At a time point 724, the first encoding module 212 executes the motion estimation on the macroblock located at a position of (3, 1, 0). At a time point 725, the first encoding module 212 executes the motion estimation on the macroblock located at a position of (2, 0, 1). It should be noticed that the encoding orders of the motion estimation in the image 702 and the image 703 are all as that shown in FIG. 4, though the executing order of the fifth encoding module 215 is the encoding order of the context entropy coding.

Figure 8:
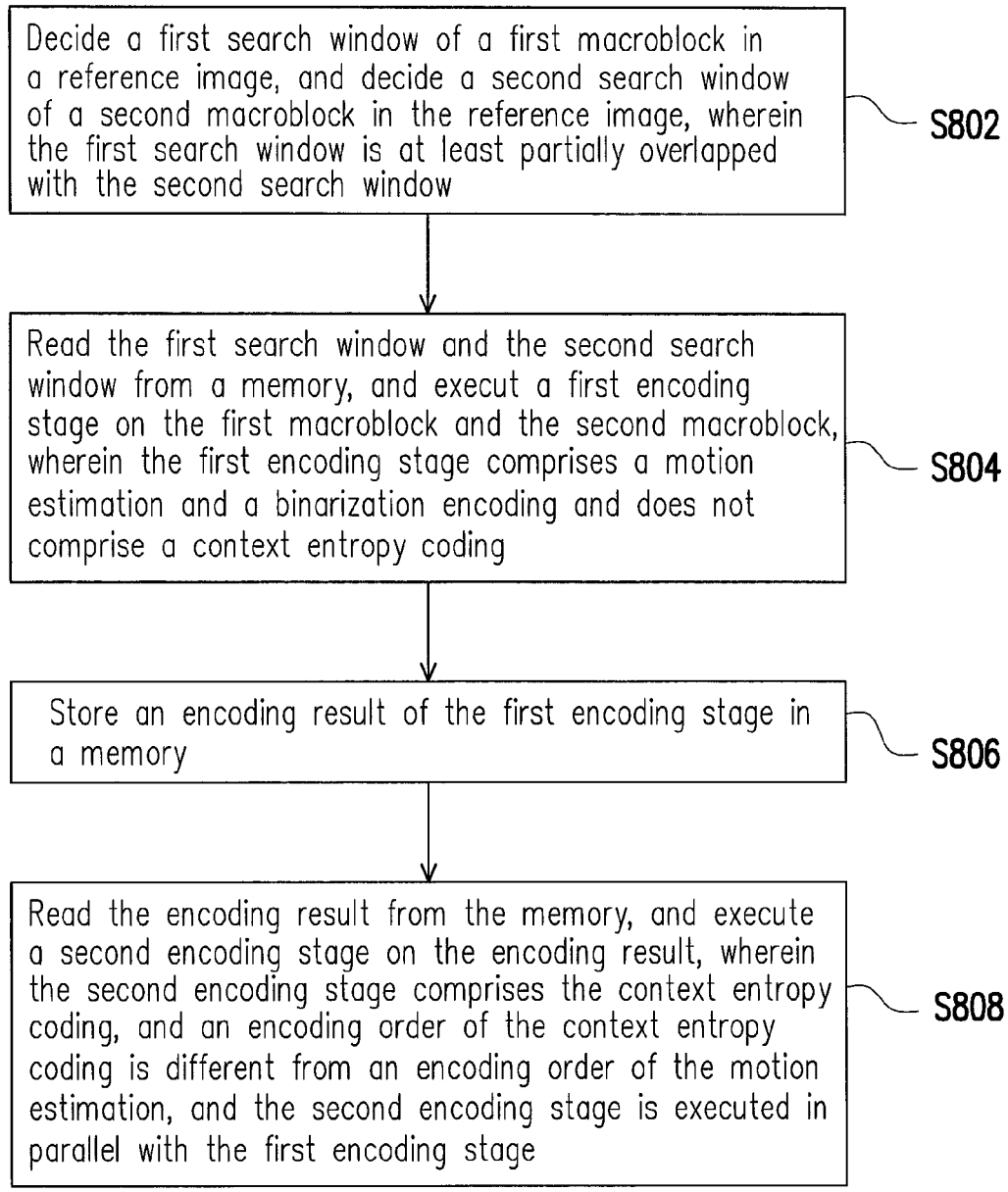
FIG. 8 is a flowchart illustrating a video encoding method according to an embodiment of the invention.

FIG. 8 is a flowchart illustrating a video encoding method according to an embodiment of the invention.

Referring to FIG. 8, in a step S802, the encoder 210 decides a first search window of a first macroblock in a reference image, and decides a second search window of a second macroblock in the reference image, where the first search window is at least partially overlapped with the second search window.

In a step S804, the encoder 210 obtains the first search window and the second search window from a memory, and executes a first encoding stage on the first macroblock and the second macroblock, where the first encoding stage includes the motion estimation and the binarization encoding, but does not include the context entropy coding.

In a step S806, the encoder 210 stores an encoding result of the first encoding stage in a memory.

In a step S808, the encoder 220 reads the encoding result from the memory, and executes a second encoding stage on the encoding result, where the second encoding stage includes the context entropy coding, and an encoding order of the context entropy coding is different from an encoding order of the motion estimation, and the second encoding stage is executed in parallel with the first encoding stage.

Various steps of FIG. 8 have been described above, and details thereof are not repeated.

In another embodiment, functions of the first encoding module 212, the second encoding module 213, the third encoding module 214, the fourth encoding module 215 and the fifth encoding module 222 are implemented by a plurality of program codes. These program codes are stored in a memory and executed by a processor, which is not limited by the invention.

Second Embodiment

The second embodiment is similar to the first embodiment, and only differences there between are described below.

Figure 9:
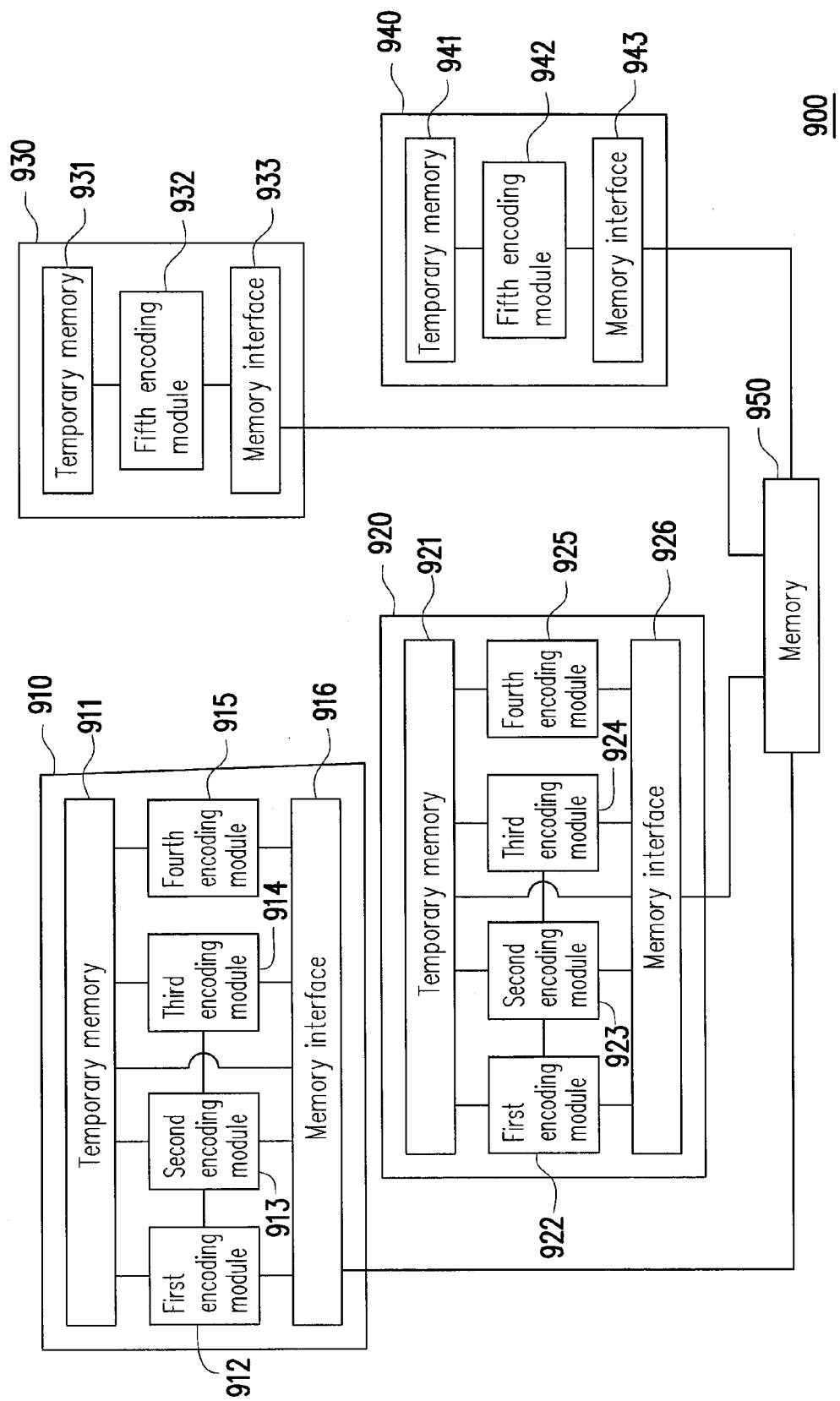
FIG. 9 is a block diagram of a video encoding device according to a second embodiment of the invention.

FIG. 9 is a block diagram of a video encoding device according to the second embodiment of the invention.

Referring to FIG. 9, the video encoding device 900 includes encoders 910, 920, 930, 940 and a memory 950. The encoder 910 includes a temporary memory 911, a first encoding module 912, a second encoding module 913, a third encoding module 914, a fourth encoding module 915 and a memory interface 916. The encoder 920 includes a temporary memory 921, a first encoding module 922, a second encoding module 923, a third encoding module 924, a fourth encoding module 925 and a memory interface 926. The encoder 930 includes a temporary memory 931, a fifth encoding module 932 a memory interface 933. The encoder 940 includes a temporary memory 941, a fifth encoding module 942 a memory interface 943. Functions of the encoders 910 and 920 are the same to that of the encoder 210 of the first embodiment, and functions of the encoders 930 and 940 are the same to that of the encoder 220 of the first embodiment.

Figure 10:
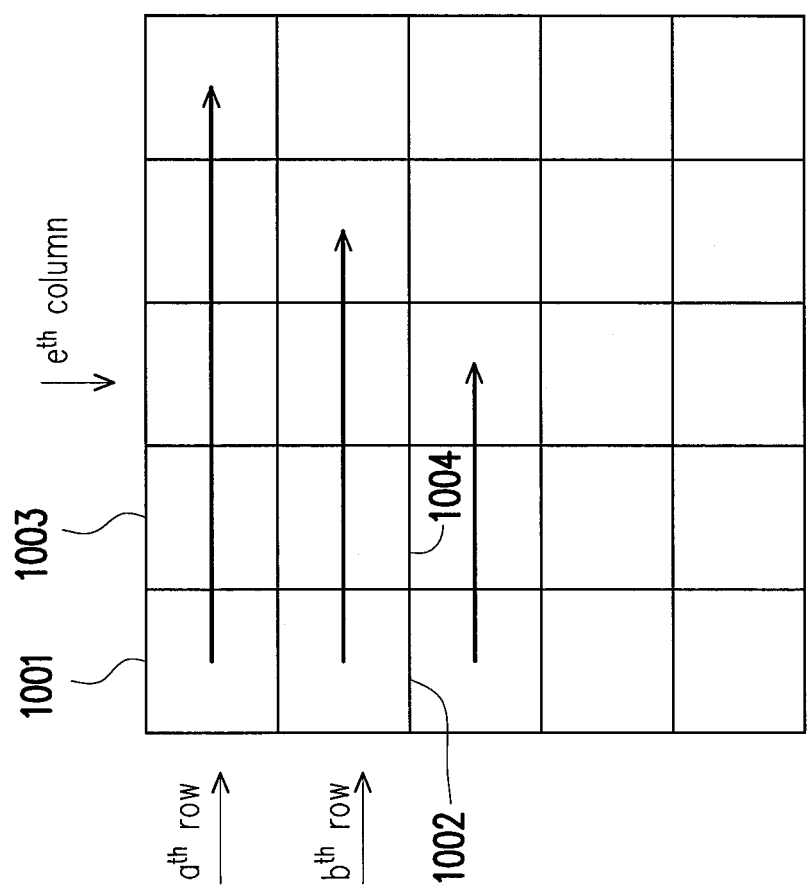
FIG. 10 is a schematic diagram of an order of motion estimation according to the second embodiment of the invention.

FIG. 10 is a schematic diagram of an order of motion estimation according to the second embodiment of the invention.

In the embodiment of FIG. 10, the encoder 910 sequentially executes the motion estimation on the macroblocks of an $a^{th}$ macroblock row in the image. When the encoder 910 encodes the macroblock of an $e^{th}$ macroblock column, the encoder 920 starts to sequentially execute the motion estimation on the macroblocks of a $b^{th}$ macroblock row, where e is an integer greater than or equal to 3. Search windows corresponding to a macroblock 1001 and a macroblock 1002 are partially overlapped, and search windows corresponding to a macroblock 1003 and a macroblock 1004 are partially overlapped. Therefore, the encoder 910 and the encoder 920 share a bandwidth of the memory 950. In an embodiment, the temporary memories 911 and 921 are in a same temporary memory, the memory interfaces 916 and 926 are implemented as a same memory interface, and the encoder 910 and the encoder 920 share the temporary memory and the memory interface. In another embodiment, the video encoding device 900 may include another encoder. After the encoder 920 executes the motion estimation on the macroblock of the $e^{th}$ column, the another encoder starts to sequentially execute the motion estimation on the macroblocks of a $(b+1)^{th}$ row. The number of the encoders in the video encoding device 900 is not limited by the invention.

Figure 11:
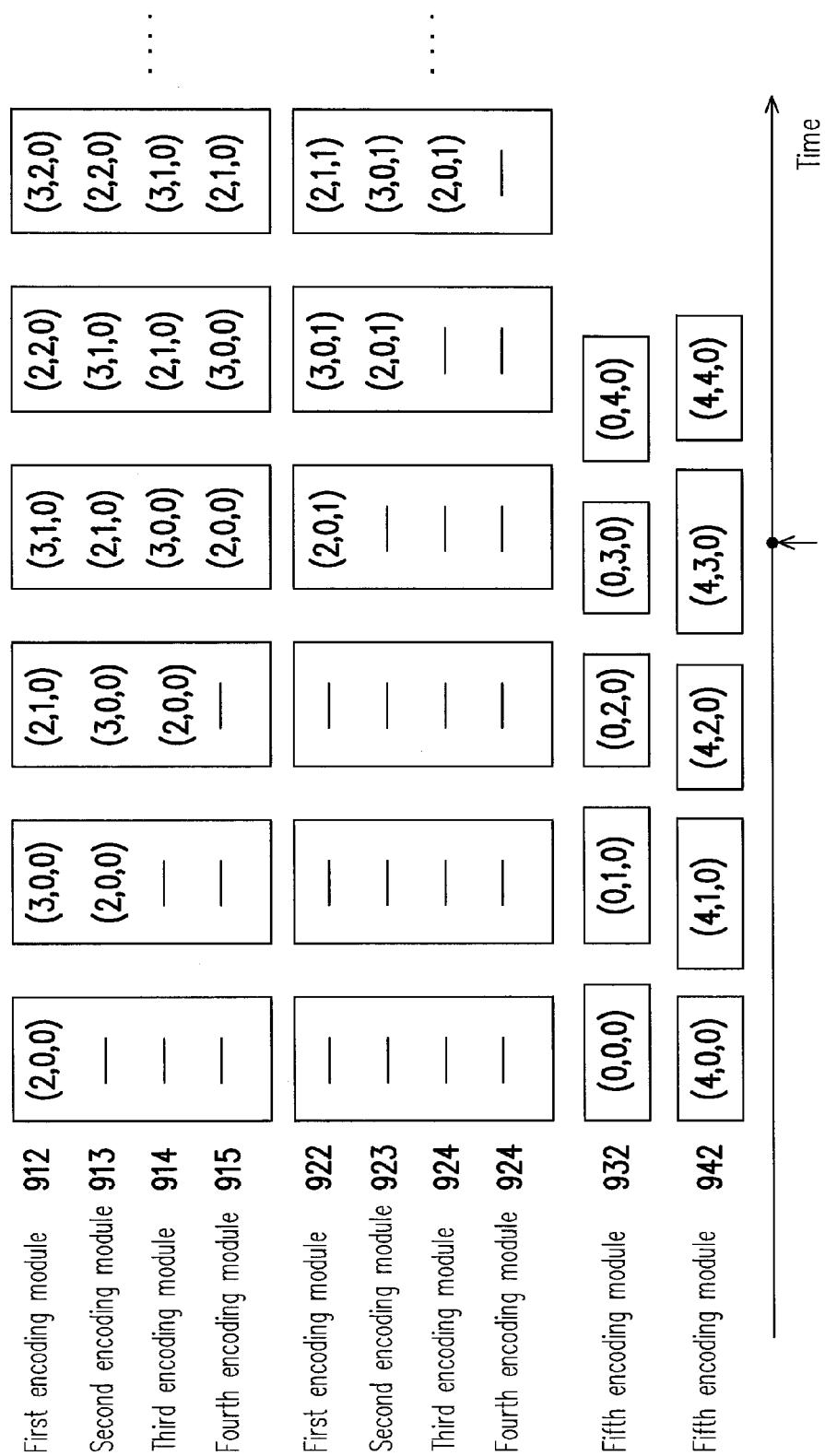
FIG. 11 is a schematic diagram of a shared reference image of two images according to the second embodiment of the invention.

FIG. 11 is a schematic diagram of a shared reference image of two images according to the second embodiment of the invention.

Referring to FIG. 7 and FIG. 11, the encoder 910 executes the motion estimation on one macroblock in the image 702 and one macroblock in the image 703 in interleaving. Moreover, when the encoder 910 encodes the macroblocks located at a $0^{th}$ row and a first column of the images 702 and 703 (a time point 1101), the encoder 920 starts to encode the macroblocks of the first rows in the images 702 and 703. Moreover, when the encoder 910 and the encoder 920 encode the images 702 and 703, the encoders 930 and 940 encode the images 701 and 704 in parallel. It should be noticed that when the encoders 930 and 940 encode the images 701 and 704 in parallel, the images 701 and 702 have been reconstructed, which does not influence the operations of the encoders 910 and 920.

Figure 12:
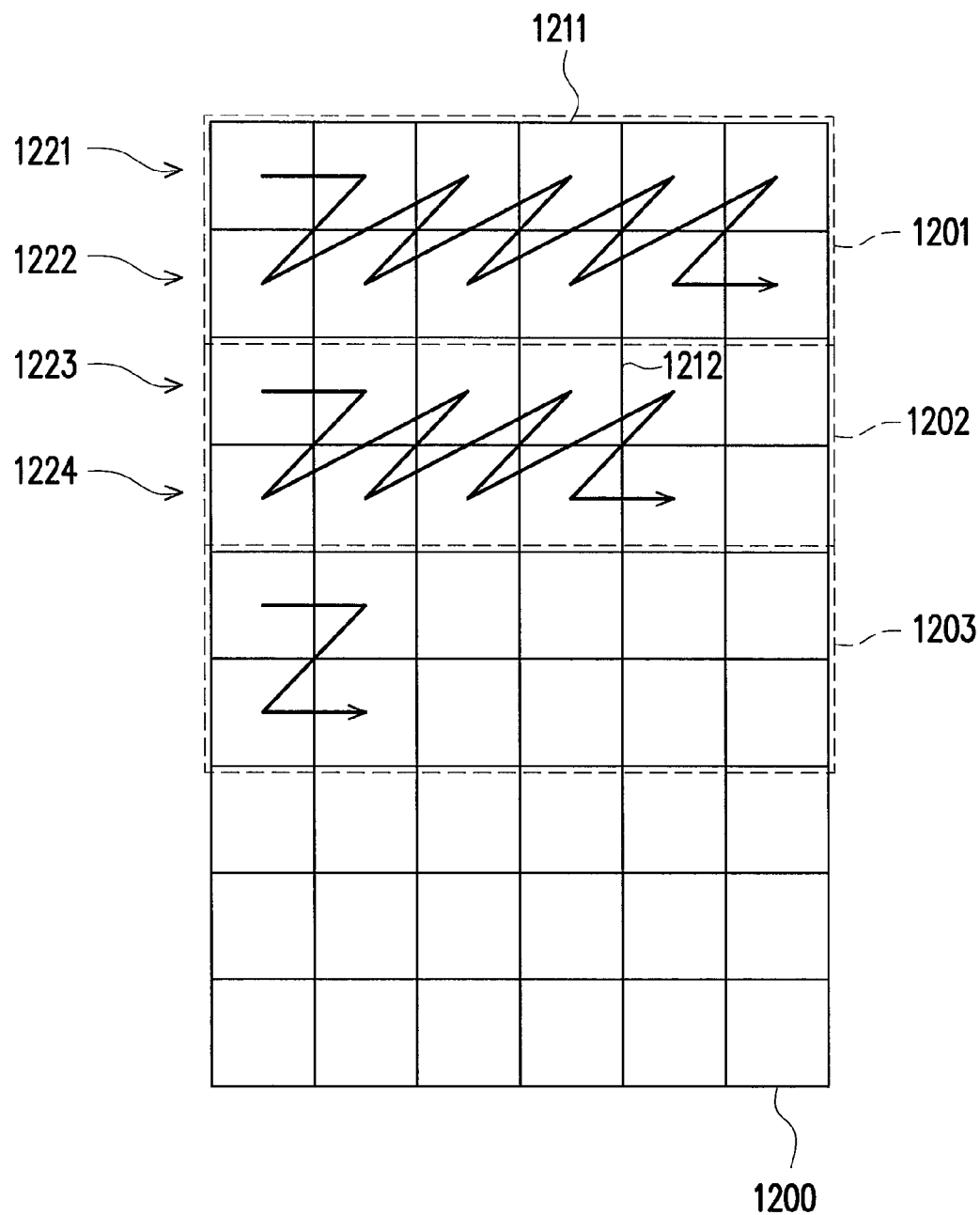
FIG. 12 is a schematic diagram of encoding different macroblock row groups according to the second embodiment of the invention.

FIG. 12 is a schematic diagram of encoding different macroblock row groups according to the second embodiment of the invention.

Referring to FIG. 12, an image 1200 includes macroblock row groups 1201, 1202 and 1203. One macroblock row group includes a plurality of macroblock rows. For example, the macroblock row group is a slice, though the invention is not limited thereto. The macroblock row group 1201 includes macroblock rows 1221 (which is also referred to as the $a^{th}$ macroblock row) and 1222 (which is also referred to as the $b^{th}$ macroblock row). The macroblock row group 1202 includes macroblock rows 1223 and 1224. The encoder 910 executes the motion estimation on one macroblock in the macroblock row 1221 and one macroblock in the macroblock row 1222 in interleaving. When the encoder 910 executes the motion estimation on a macroblock 1211, the encoder 920 starts to execute the motion estimation on the macroblocks in the macroblock row group 1202. The encoder 920 executes the motion estimation on one macroblock in the macroblock row 1223 and one macroblock in the macroblock row 1224 in interleaving. In another embodiment, the video encoding device 900 may include another encoder. When the encoder 920 executes the motion estimation on a macroblock 1212, the other encoder starts to execute the motion estimation on the macroblocks in the macroblock row group 1203.

In summary, in the video encoding method and the video encoding device provided by the embodiment, the binarization encoding and the context entropy coding are implemented on different encoders. In this way, the encoding order of the motion estimation and the encoding order of the context entropy coding may be different, which decreases a bandwidth demand of the memory.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A video encoding method, for a video encoding device, the video encoding method comprising:

deciding a first search window in a first reference image, with respect to a first macroblock of a current image, and deciding a second search window in the first reference image, with respect to a second macroblock of the current image, wherein the first search window is at least partially overlapped with the second search window;

reading pixel values within the first search window and the second search window in the first reference image from a memory, and executing a first encoding stage on the first macroblock and the second macroblock of the current image, so as to generate a first encoding result with respect to the first macroblock and a second encoding result with respect to the second macroblock, wherein the first encoding stage comprises a motion estimation and a binarization encoding;

executing a second encoding stage on a macroblock of a previous image, wherein executing the second encoding stage on the macroblock of the previous image comprises executing a context entropy coding on a third encoding result with respect to the macroblock of the previous image which is generated by executing the first encoding stage on the macroblock of the previous image, and the context entropy coding of the second encoding stage on the macroblock of the previous image is executed in parallel with the motion estimation of the first encoding stage on the first macroblock of the current image, wherein the binarization encoding and the context entropy coding are implemented on different encoder, wherein an encoding sequence according to which the macroblocks of the current image are processed in the context entropy coding of the second encoding stage is different from an encoding sequence according to which the macroblocks of the current image are processed in the motion estimation of the first encoding stage.

2. The video encoding method as claimed in claim 1, wherein the current image comprises a plurality of macroblock rows, the first macroblock is comprised in an $a^{th}$ macroblock row of the macroblock rows, and the second macroblock is comprised in a $b^{th}$ macroblock row of the macroblock rows, wherein a and b are positive integers, and the positive integer a is different to the positive integer b.

3. The video encoding method as claimed in claim 2, wherein an absolute difference between the positive integers a and b is greater than or equal to 2.

4. The video encoding method as claimed in claim 2, wherein the second macroblock is a $c^{th}$ macroblock of the $b^{th}$ macroblock row, and the step of executing the first encoding stage on the first macroblock and the second macroblock comprises:
   executing the motion estimation on the second macroblock in the $b^{th}$ macroblock row after executing the motion estimation on a $(c+d)^{th}$ macroblock of the $a^{th}$ macroblock row, wherein c is a positive integer, and d is a positive integer greater than or equal to 2.

5. The video encoding method as claimed in claim 2, wherein the video encoding method further comprises:
   using a first encoder to sequentially execute the motion estimation on macroblocks of the $a^{th}$ macroblock row;
   using a second encoder to sequentially execute the motion estimation on macroblocks of the $b^{th}$ macroblock row when the first encoder executes the motion estimation on an $e^{th}$ macroblock of the $a^{th}$ macroblock row, wherein e is a positive integer greater than or equal to 3.

6. The video encoding method as claimed in claim 2, wherein the current image comprises a plurality of macroblock row groups comprising a first macroblock row group and a second macroblock row group, the $a^{th}$ macroblock row and the $b^{th}$ macroblock row belong to the first macroblock row group and the second macroblock row group comprises a first macroblock row and a second macroblock row, and wherein the step of executing the first encoding stage comprises:
   using a first encoder to execute the motion estimation on one macroblock of the $a^{th}$ macroblock row and one macroblock of the $b^{th}$ macroblock row in interleaving, and meanwhile using a second encoder to execute the motion estimation on one macroblock of the a first macroblock row and one macroblock of the second macroblock row in interleaving.

7. The video encoding method as claimed in claim 1, wherein the context entropy coding comprises an arithmetic coding.

8. A video encoding device, comprising:
   a first encoder, deciding a first search window in a first reference image, with respect to a first macroblock of a current image, and deciding a second search window in the first reference image, with respect to a second macroblock of the current image, wherein the first search window is at least partially overlapped with the second search window;
   a second encoder; and
   a memory, coupled to the first encoder and the second encoder,
   wherein the first encoder reads pixel values within the first search window and the second search window in the first reference image from the memory, and executes a first encoding stage on the first macroblock and the second macroblock of the current image, so as to generate a first encoding result with respect to the first macroblock and a second encoding result with respect to the second macroblock, wherein the first encoding stage comprises a motion estimation and a binarization encoding,
   wherein the second encoder executes a second encoding stage on a macroblock of a previous image, wherein the second encoding stage comprises a context entropy coding, the second encoder executes the context entropy coding on a third encoding result with respect to the macroblock of the previous image which is generated by executing the first encoding stage on the macroblock of the previous image, and the context entropy coding of the second encoding stage on the macroblock of the previous image is executed in parallel with the motion estimation of the first encoding stage on the first macroblock of the current image,
   wherein the binarization encoding and the context entropy coding are implemented on different encoder,
   wherein an encoding sequence according to which the macroblocks of the current image are processed in the context entropy coding of the second encoding stage is different from an encoding sequence according to which the macroblocks of the current image are processed in the motion estimation of the first encoding stage.

9. The video encoding device as claimed in claim 8, wherein the current image comprises a plurality of macroblock rows, the first macroblock is comprised in an $a^{th}$ macroblock row of the macroblock rows, and the second macroblock is comprised in a $b^{th}$ macroblock row of the macroblock rows, wherein a and b are positive integers, and the positive integer a is different to the positive integer b.

10. The video encoding device as claimed in claim 9, wherein an absolute difference between the positive integers a and b is greater than or equal to 2.

11. The video encoding device as claimed in claim 9, wherein the second macroblock is a $c^{th}$ macroblock of the $b^{th}$ macroblock row,
   the first encoder executes the motion estimation on the second macroblock in the $b^{th}$ macroblock row after executing the motion estimation on a $(c+d)^{th}$ macroblock of the $a^{th}$ macroblock row, wherein c is a positive integer, and d is a positive integer greater than or equal to 2.

12. The video encoding device as claimed in claim 9, wherein the video encoding device further comprises:
   a third encoder,
   wherein the first encoder sequentially executes the motion estimation on macroblocks of the $a^{th}$ macroblock row, when the first encoder executes the motion estimation on an $e^{th}$ macroblock of the $a^{th}$ macroblock row, the third encoder sequentially executes the motion estimation on macroblocks of the $b^{th}$ macroblock row, wherein e is a positive integer greater than or equal to 3.

13. The video encoding device as claimed in claim 9, wherein the current image comprises a plurality of macroblock row groups comprising a first macroblock row group and a second macroblock row group, the $a^{th}$ macroblock row and the $b^{th}$ macroblock row belong to the first macroblock row group, and the second macroblock row group comprises a first macroblock row and a second macroblock row, and the video encoding device further comprises:
   a third encoder,
   wherein the first encoder executes the motion estimation on one macroblock of the $a^{th}$ macroblock row and one macroblock of the $b^{th}$ macroblock row in interleaving, and meanwhile the third encoder executes the motion estimation on one macroblock of the a first macroblock row and one macroblock of the second macroblock row in interleaving.

14. The video encoding device as claimed in claim 8, wherein the context entropy coding comprises an arithmetic coding.

15. The video encoding method as claimed in claim 1, further comprising:

deciding a third search window in a second reference image, with respect to the first macroblock of the current image, wherein the motion estimation of the first encoding stage on the first macroblock of the current image is executed based on both the pixel values within the first search window in the first reference image and pixel values within the third search window in the second reference image.

16. The video encoding method as claimed in claim 1, further comprising:

executing, in an interleaving way per at least one macroblock, the motion estimation on macroblocks of the current image and the motion estimation on macroblocks of an another image.

17. The video encoding device as claimed in claim 8, wherein the first encoder decides a third search window in a second reference image, with respect to the first macroblock of the current image, wherein the motion estimation of the first encoding stage on the first macroblock of the current image is executed based on both the pixel values within the first search window in the first reference image and pixel values within the third search window in the second reference image.

18. The video encoding device as claimed in claim 8, wherein the first encoder executes, in an interleaving way per at least one macroblock, the motion estimation on macroblocks of the current image and the motion estimation on macroblocks of an another image.

\* \* \* \* \*